(12) United States Patent
Kumar et al.

(10) Patent No.: US 12,313,600 B2
(45) Date of Patent: May 27, 2025

(54) SMART METAL-LOSS MONITORING FOR COIL TUBING

(71) Applicant: SAUDI ARABIAN OIL COMPANY, Dhahran (SA)

(72) Inventors: Sanjiv Kumar, Dhanbad (IN); Abdullah K. Alghannam, Al-Ahsa (SA); Keshabananda Baruah, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/472,977

(22) Filed: Sep. 22, 2023

(65) Prior Publication Data
US 2025/0102472 A1    Mar. 27, 2025

(51) Int. Cl.
*G01N 29/27* (2006.01)
*E21B 19/22* (2006.01)
(Continued)

(52) U.S. Cl.
CPC .............. *G01N 29/27* (2013.01); *E21B 19/22* (2013.01); *G01N 29/07* (2013.01);
(Continued)

(58) Field of Classification Search
CPC ........ E21B 47/006; E21B 47/00; E21B 19/22; G01N 29/27; G01N 29/07; G01N 29/4427;
(Continued)

(56) References Cited

U.S. PATENT DOCUMENTS 5,533,572 A * 7/1996 Brady ................... E21B 47/006
                                                         204/404
6,131,659 A * 10/2000 Johnson ................ E21B 47/006
                                                         73/152.57
(Continued)

FOREIGN PATENT DOCUMENTS

| CN | 111102945 A | 5/2020 |
| EP | 0 377 234 A1 | 7/1990 |
| EP | 2 891 761 B1 | 2/2019 |

OTHER PUBLICATIONS

Rosen, Patrik M. A., "Remote Coiled Tubing Operation Monitoring"; Proceedings of the SPE/ICoTA Coiled Tubing Roundtable; Paper No. SPE-46038-MS; pp. 1-7; Mar. 15, 1998 (7 pages).

*Primary Examiner* — Yanick A Akaragwe
(74) *Attorney, Agent, or Firm* — Osha Bergman Watanabe & Burton LLP

(57) ABSTRACT

A system for monitoring tubing during feeding into a conduit includes a collar, a plurality of sensors, and a computer system. The collar is positioned around the tubing. The sensors include ultrasonic transducers and fingers oriented radially inward from the collar. The computer system is configured to measure the outer dimensions and thickness of the tubing using the fingers and ultrasonic transducers respectively as well as trigger alerts based off of the measurements of thickness and outer dimensions of the tubing. The system for monitoring tubing further includes a tubing feed system. The tubing feed system includes tubing, an injector head, and conduit. The injector head feeds the tubing into the conduit under control of the computer.

16 Claims, 4 Drawing Sheets

(51) Int. Cl.
*G01N 29/07* (2006.01)
*G01N 29/44* (2006.01)

(52) U.S. Cl.
CPC ..... *G01N 29/4427* (2013.01); *G01N 29/4445* (2013.01); *G01N 2291/02854* (2013.01); *G01N 2291/106* (2013.01); *G01N 2291/2634* (2013.01)

(58) Field of Classification Search
CPC ..... G01N 29/4445; G01N 2291/02854; G01N 2291/106; G01N 2291/2634; G01N 29/14; G01N 29/44; G01N 29/28; G01N 29/225
See application file for complete search history.

(56) References Cited

U.S. PATENT DOCUMENTS

| | | | |
|---|---|---|---|
| 7,080,557 B2 | 7/2006 | Adnan | |
| 7,357,179 B2 * | 4/2008 | Zheng | E21B 41/00 166/250.01 |
| 7,458,267 B2 | 12/2008 | McCoy | |
| 8,365,601 B2 * | 2/2013 | Minachi | G01N 29/043 73/644 |
| 9,599,593 B2 | 3/2017 | Cawley et al. | |
| 10,274,462 B2 * | 4/2019 | Restivo | G01N 17/043 |
| 11,029,283 B2 * | 6/2021 | Zheng | G01N 27/83 |
| 2004/0200282 A1 * | 10/2004 | Adnan | G01N 29/225 73/644 |
| 2006/0101914 A1 * | 5/2006 | McCoy | G01N 29/14 73/592 |
| 2011/0088476 A1 * | 4/2011 | Yamano | G01N 29/043 73/632 |
| 2016/0091411 A1 * | 3/2016 | Hedtke | G01N 17/00 324/700 |
| 2017/0153108 A1 * | 6/2017 | Kitazawa | G01N 29/348 |
| 2020/0158690 A1 * | 5/2020 | Tamura | G01N 29/2437 |
| 2022/0283331 A1 * | 9/2022 | Volker | E21B 47/01 |

* cited by examiner

SMART METAL-LOSS MONITORING FOR COIL TUBING

BACKGROUND

In the process of well drilling and completion operations, it is often necessary to feed tubing into a larger section of tubing. Hereafter, the larger tubing is referred to as a conduit, for clarity. The process of feeding tubing into conduit, as well as the initial state of the tubing, can lead to damage or out of specification tubing being fed into the conduit. Doing so can lead to complications, such as leaks, buckling, breakage, etc. These risks are particularly notable in the case of coiled tubing, where the action of coiling and uncoiling can involve significant strain on the tubing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system for monitoring tubing during feeding into a conduit. The tubing measuring device includes a collar, a plurality of sensors, and a computer system. The collar is positioned around the tubing. The sensors include ultrasonic transducers and fingers oriented radially inward from the collar. The computer system is configured to measure the outer dimensions and thickness of the tubing using the fingers and ultrasonic transducers respectively as well as trigger alerts based off of the measurements of thickness and outer dimensions of the tubing. The system for monitoring tubing further includes a tubing feed system. The tubing feed system includes tubing, an injector head, and conduit. The injector head feeds the tubing into the conduit under control of the computer.

In general, in one aspect, embodiments relate to a method for monitoring tubing conditions during feeding into a conduit. The method includes feeding tubing into a conduit and measuring the outer dimensions and thickness of the tubing while the tubing is fed. The system for measuring the tubing includes a collar, sensors fitted to the collar, and a computer. The sensors are oriented radially inwards from the collar. The computer is configured to measure the outer dimensions and thickness of the tubing with the sensors and trigger alerts based on the data from the sensors. The system for feeding the tubing into the conduit includes tubing, an injector head, and conduit. The injector head feeds the tubing into the conduit under control of the computer.

In general, in one aspect, embodiments relate to a non-transient computer-readable medium containing program instructions for causing a computer to perform a method. The method includes feeding tubing into a conduit and measuring the outer dimensions and thickness of the tubing while the tubing is fed. The system for measuring the tubing includes a collar, sensors fitted to the collar, and a computer. The sensors are oriented radially inwards from the collar. The computer is configured to measure the outer dimensions and thickness of the tubing with the sensors and trigger alerts based on the data from the sensors. The system for feeding the tubing into the conduit includes tubing, an injector head, and conduit. The injector head feeds the tubing into the conduit under control of the computer.

Other aspects and advantages of the claimed subject matter will be apparent from the following description and the appended claims.

DETAILED DESCRIPTION

In one aspect, one or more embodiments disclosed herein relate to systems to monitor the physical status of tubing for signs of weakness, damage, or other compromise. This is accomplished by a variety of sensors including ultrasonic transducers and finger sensors measuring the tubing as the tubing is fed through the system so that the entire length of tubing to be fed gets measured and examined for defects.

Embodiments of the present disclosure may provide at least one of the following advantages. The continuous monitoring of tubing inner and outer dimensions can identify defects and deviations before the errant tubing is fed into conduit. By measuring the tubing between the injector head and the conduit, the tubing is measured after being deformed through the reel and any other curves that may be part of the tubing path before being fed into the conduit. The use of ultrasonic transducers to measure the tubing can reveal hidden defects within the tubing not apparent from a cursory visual inspection.

Figure 1:
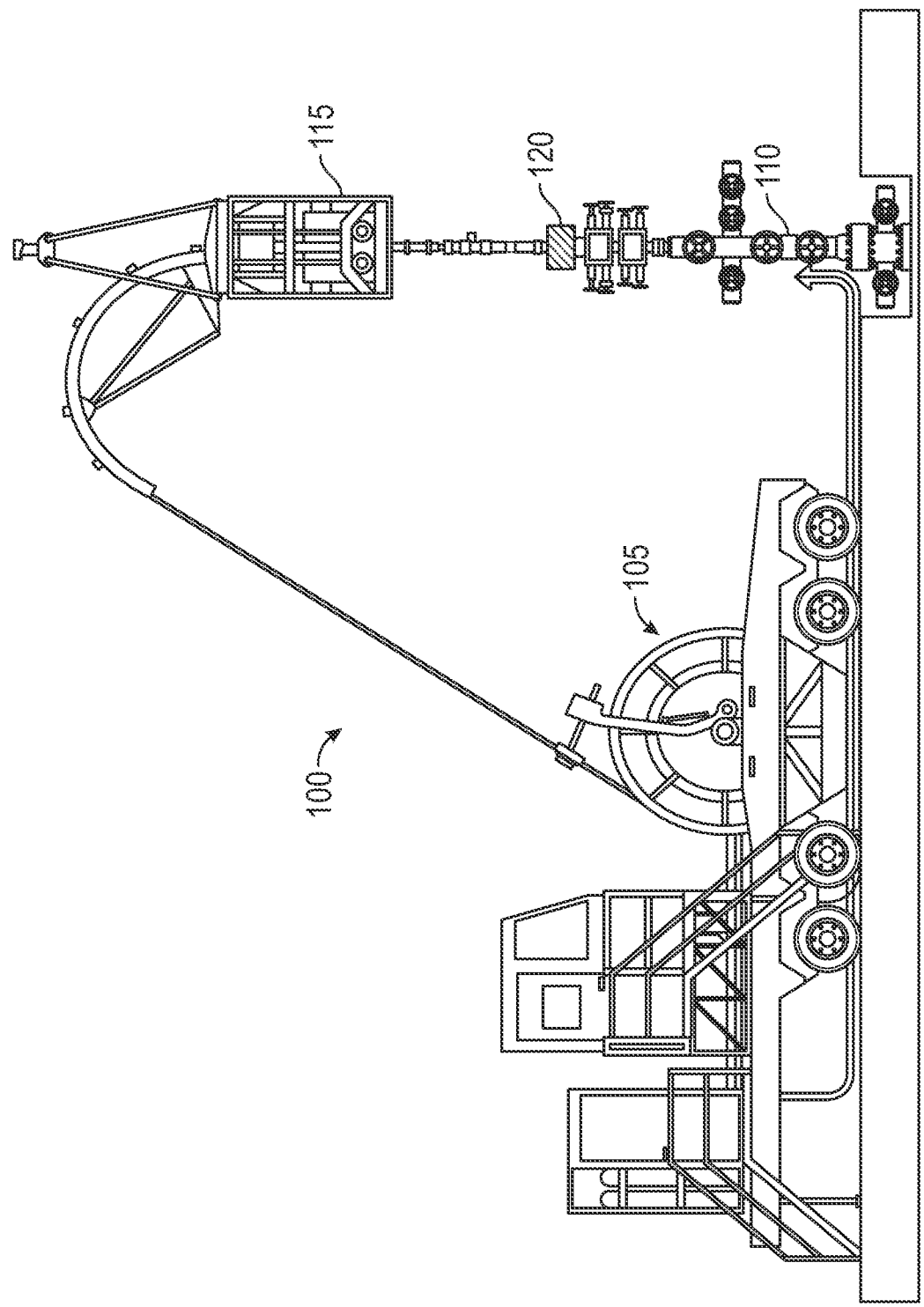
FIG. 1 shows a tubing feed system in accordance with one or more embodiments.

FIG. 1 shows a tubing feed system in accordance with one or more embodiments. Tubing 100 may be pulled from a reel 105 and pushed through conduit 110 by an injector head 115 through which the tubing 100 passes. To enable continuous monitoring of the tubing 100 as the tubing 100 is fed into the conduit 110, a tubing measuring device 120 may be positioned around the tubing 100 between the injector head 115 and the conduit 110. The tubing feed system may as well be used on segments of tubing 100. The tubing 100 being fed from a reel 105 is simply a common context in which this is beneficial.

Figure 2:
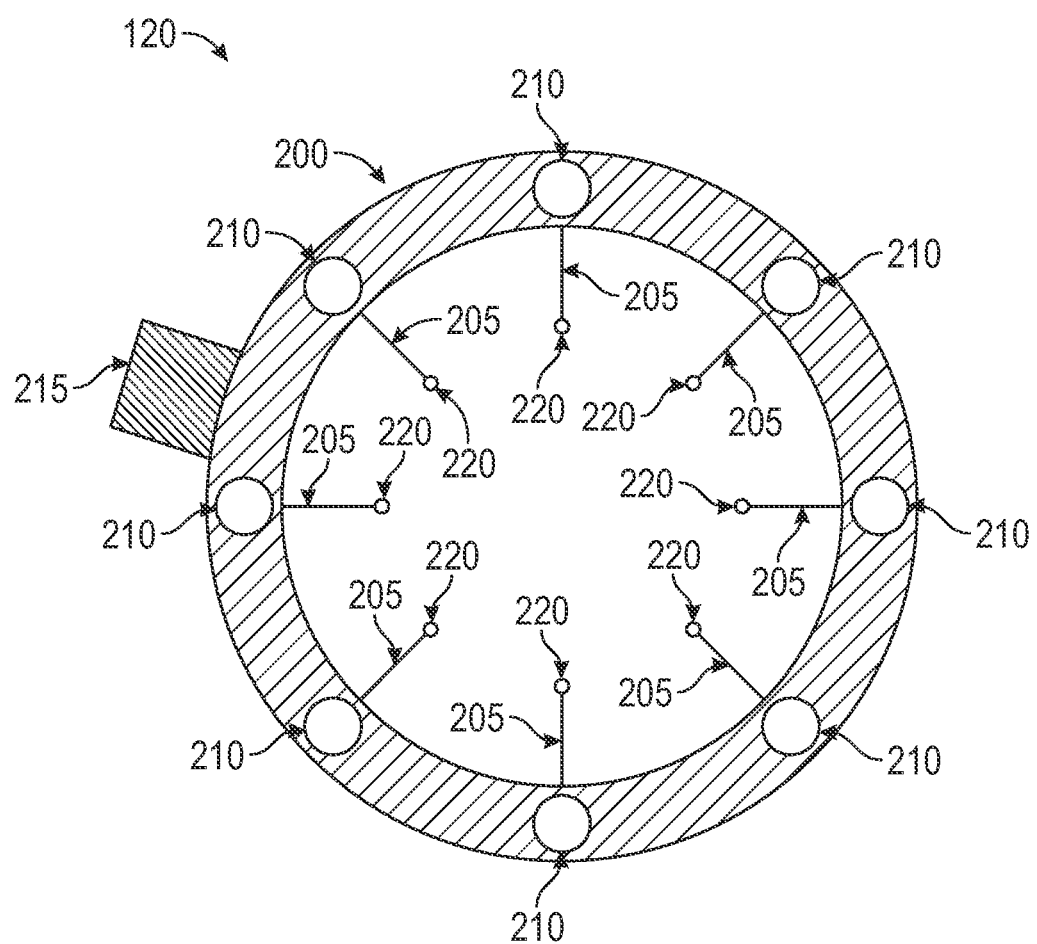
FIG. 2 shows a tubing measuring device in accordance with one or more embodiments.

FIG. 2 shows a tubing measuring device in accordance with one or more embodiments. The tubing measuring device may be comprised of a collar 200 fitted with sensors such as fingers 205 and ultrasonic transducers 210 as well as a computer system 215 to process the data from the sensors. The fingers 205 may be oriented radially inward to contact the outside of the tubing 100 as the tubing 100 is fed through. To enable smooth motion of the fingers 205 along the tubing 100, the fingers 205 may have a friction reducing feature, such as rollers 220, on the inward end of the fingers 205. The ultrasonic transducers 210 may be mounted to the inward end of the fingers 205 or alternately mounted directly to the collar 200.

Figure 3:
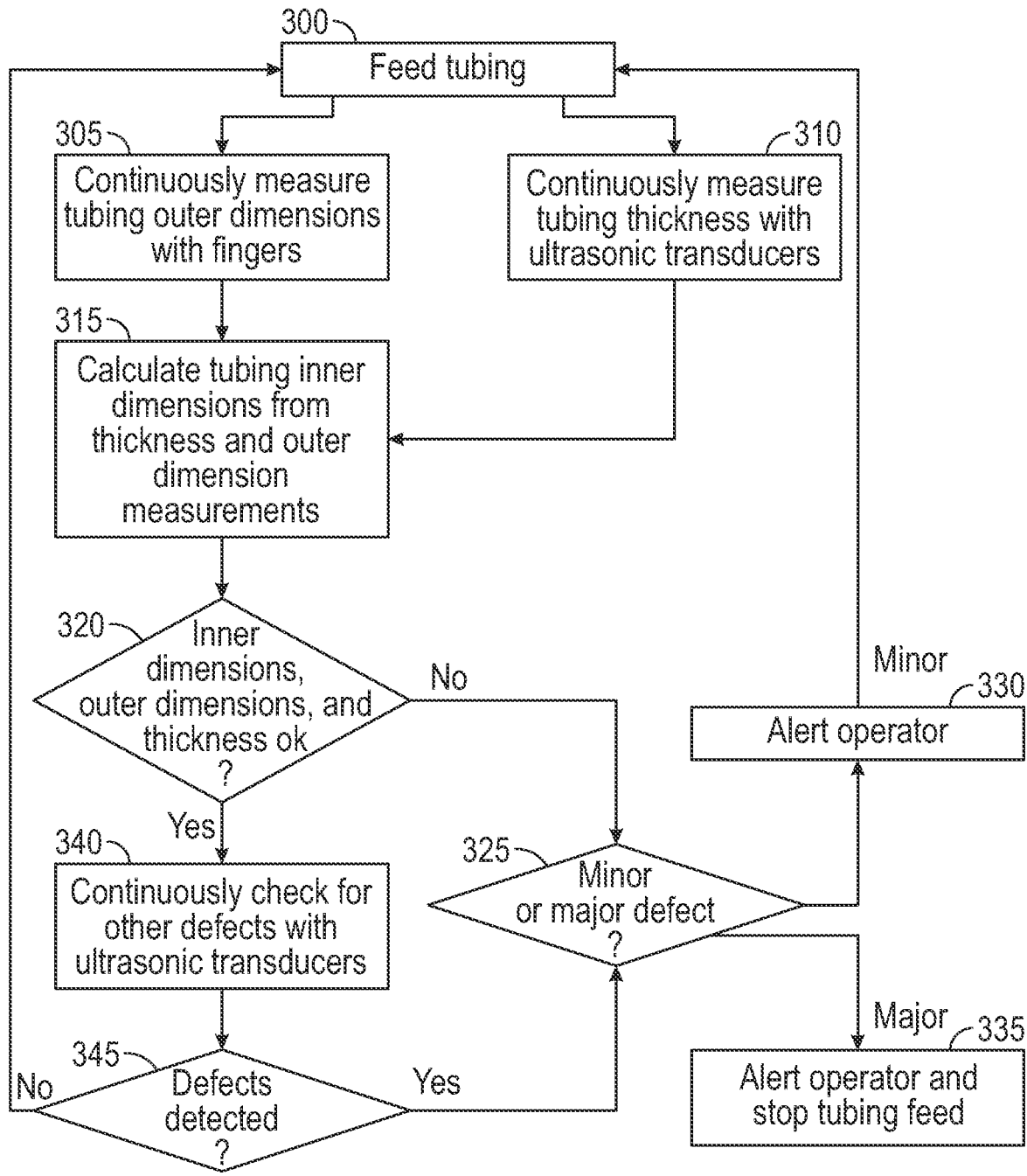
FIG. 3 is a flowchart in accordance with one or more embodiments.

FIG. 3 is a flowchart in accordance with one or more embodiments. A method for monitoring tubing conditions may be executed automatically by a computer system 215. The method for monitoring tubing conditions may be as follows.

Step 300 is to feed the tubing 100 from the reel 105 into the conduit 110. As step 300 is being executed continuously, step 305 and step 310 may be executed simultaneously. Step 305 is to continuously measure the outer dimensions of the tubing 100 based on the deflection of the fingers 205. Step 310 is to continuously measure the thickness of the tubing 100 with a number of ultrasonic transducers 210 based on the signals sent and received by the ultrasonic transducers 210. Step 315 is to use the measured tubing thickness and outer dimensions to calculate the inner dimensions of the tubing.

Step 320 is to check whether the inner dimensions, outer dimensions, and thickness parameters of the tubing are within a range that is preconfigured as nominal or whether one or more of the parameters is beyond a preconfigured threshold that characterizes the measurement, which may determine that a defect is a minor defect or a major defect. The ultrasonic transducers 210 may also be used to continuously monitor for other defects as in step 340. If a measurement characterized as a minor defect is detected, the computer system 215 may trigger an alert. If a measurement characterized as a major defect is detected, the computer system 215 may trigger an alert and stop the feeding of tubing 100. If no defects are detected and the range is determined to be nominal, the feeding of coil tubing 100 may continue as normal.

Figure 4:
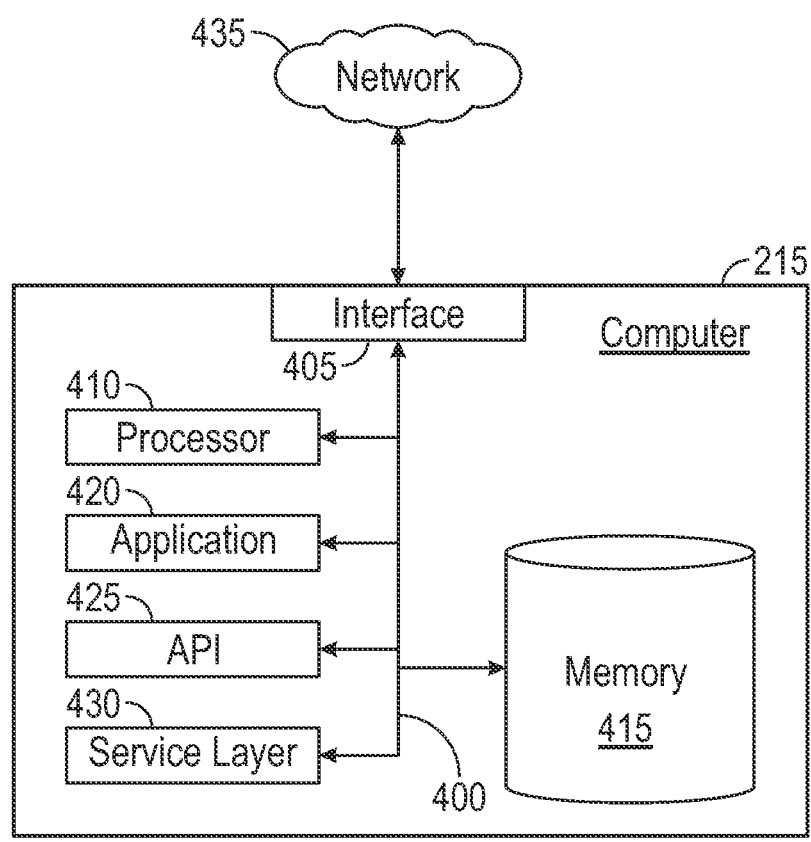
FIG. 4 is a diagram of a computer system in accordance with one or more embodiments.

FIG. 4 is a block diagram of a computer system in accordance with one or more embodiments. The illustrated computer system 215 may be communicably coupled to the sensors of the tubing monitoring device and the injector head 115 so that the computer system 215 may monitor and control the feeding of tubing 100. The illustrated computer 215 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 215 may include a computer that includes an input device, such as a keypad, keyboard, touch screen, or other device that can accept user information, and an output device that conveys information associated with the operation of the computer 215, including digital data, visual, or audio information (or a combination of information), or a GUI.

The computer 215 can serve in a role as a client, network component, a server, a database or other persistency, or any other component (or a combination of roles of a computer system for performing the subject matter described in the instant disclosure. The illustrated computer 215 is communicably coupled with a network 435. In some implementations, one or more components of the computer 215 may be configured to operate within environments, including cloud-computing-based, local, global, or other environment (or a combination of environments).

At a high level, the computer 215 is an electronic computing device operable to receive, transmit, process, store, or manage data and information associated with the described subject matter. According to some implementations, the computer 215 may also include or be communicably coupled with an application server, e-mail server, web server, caching server, streaming data server, business intelligence (BI) server, or other server (or a combination of servers).

The computer 215 can receive requests over network 435 from a client application (for example, executing on another computer 215) and responding to the received requests by processing the said requests in an appropriate software application. In addition, requests may also be sent to the computer 215 from internal users (for example, from a command console or by other appropriate access method), external or third-parties, other automated applications, as well as any other appropriate entities, individuals, systems, or computers.

Each of the components of the computer 215 can communicate using a system bus 400. In some implementations, any or all of the components of the computer 215, both hardware or software (or a combination of hardware and software), may interface with each other or the interface 405 (or a combination of both) over the system bus 400 using an application programming interface (API) 425 or a service layer 430 (or a combination of the API 425 and service layer 430. The API 425 may include specifications for routines, data structures, and object classes. The API 425 may be either computer-language independent or dependent and refer to a complete interface, a single function, or even a set of APIs. The service layer 430 provides software services to the computer 215 or other components (whether or not illustrated) that are communicably coupled to the computer 215. The functionality of the computer 215 may be accessible for all service consumers using this service layer. Software services, such as those provided by the service layer 430, provide reusable, defined business functionalities through a defined interface. For example, the interface may be software written in JAVA, C++, or other suitable language providing data in extensible markup language (XML) format or another suitable format. While illustrated as an integrated component of the computer 215, alternative implementations may illustrate the API 425 or the service layer 430 as stand-alone components in relation to other components of the computer 215 or other components (whether or not illustrated) that are communicably coupled to the computer 215. Moreover, any or all parts of the API 425 or the service layer 430 may be implemented as child or sub-modules of another software module, enterprise application, or hardware module without departing from the scope of this disclosure.

The computer 215 includes an interface 405. Although illustrated as a single interface 405 in FIG. 4, two or more interfaces 405 may be used according to particular needs, desires, or particular implementations of the computer 215. The interface 405 is used by the computer 215 for communicating with other systems in a distributed environment that are connected to the network 435. Generally, the interface 405 includes logic encoded in software or hardware (or a combination of software and hardware) and operable to communicate with the network 435. More specifically, the interface 405 may include software supporting one or more communication protocols associated with communications such that the network 435 or interface's hardware is operable to communicate physical signals within and outside of the illustrated computer 215.

The computer 215 includes at least one computer processor 410. Although illustrated as a single computer processor 410 in FIG. 4, two or more processors may be used according to particular needs, desires, or particular implementations of the computer 215. Generally, the computer processor 410 executes instructions and manipulates data to perform the operations of the computer 215 and any algorithms, methods, functions, processes, flows, and procedures as described in the instant disclosure.

The computer 215 also includes a memory 415 that holds data for the computer 215 or other components (or a combination of both) that can be connected to the network 435. For example, memory 415 can be a database storing data consistent with this disclosure. Although illustrated as a single memory 415 in FIG. 4, two or more memories may be used according to particular needs, desires, or particular implementations of the computer 215 and the described functionality. While memory 415 is illustrated as an integral component of the computer 215, in alternative implementations, memory 415 can be external to the computer 215.

The application 420 is an algorithmic software engine providing functionality according to particular needs, desires, or particular implementations of the computer 215, particularly with respect to functionality described in this disclosure. For example, application 420 can serve as one or more components, modules, applications, etc. Further, although illustrated as a single application 420, the application 420 may be implemented as multiple applications 420 on the computer 215. In addition, although illustrated as integral to the computer 215, in alternative implementations, the application 420 can be external to the computer 215.

There may be any number of computers 215 associated with, or external to, a computer system containing a computer 215, wherein each computer 215 communicates over network 435. Further, the term "client," "user," and other appropriate terminology may be used interchangeably as appropriate without departing from the scope of this disclosure. Moreover, this disclosure contemplates that many users may use one computer 215, or that one user may use multiple computers 215.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for monitoring tubing during feeding into a conduit comprising:
 a tubing measuring device comprising:
  a collar configured to be positioned around the tubing, and
  a plurality of sensors comprising:
   a plurality of ultrasonic transducers, and
   a plurality of fingers,
    wherein the plurality of fingers is oriented radially inward from the collar, and
  a computer system, wherein the computer system is configured to:
  communicably couple to the plurality of ultrasonic transducers, measure a thickness based on ultrasonic signals sent and received by the plurality of ultrasonic transducers,
  communicably couple to the plurality of fingers, measure outer dimensions of the tubing by measuring deflection of the plurality of fingers, and trigger alerts based off measurements of tubing thickness and outer dimensions; and
 a tubing feed system comprising:
  an injector head that directs the tubing into the conduit, and the conduit, wherein the tubing measuring device is disposed around the tubing between the injector head and the conduit, wherein data is continually sent from the plurality of sensors to the computer system, and wherein the computer system triggers the alerts based on the data received from the sensors.

2. The system of claim 1,
wherein the computer system is communicably connected to the injector head,
wherein the computer system is configured to monitor and control the feeding of the tubing.

3. The system of claim 1,
wherein one or more fingers of the plurality of fingers comprises one or more rollers on a contact end of the one or more fingers.

4. The system of claim 1,
wherein the plurality of ultrasonic transducers are connected to the plurality of fingers on the inward end of the plurality of fingers.

5. The system of claim 1,
wherein the plurality of ultrasonic transducers are mounted directly to the collar.

6. The system of claim 1,
wherein the tubing feed system further comprises a reel that holds the tubing as a coil for unrolling and feeding into the conduit.

7. A method for monitoring tubing conditions during feeding into a conduit comprising:
 feeding tubing into the conduit via a tubing feed system comprising:
  an injector head that directs the tubing into the conduit,
 disposing a tubing measuring device between the injector head and the conduit; and
 monitoring the condition of the tubing with the tubing measuring device comprising:
  a collar configured to be fitted around the tubing; and
  a plurality of sensors comprising:
   a plurality of ultrasonic transducers,
    wherein the plurality of ultrasonic transducers continuously measure a thickness of the tubing,
    wherein the plurality of ultrasonic transducers continuously monitor for defects, and
   a plurality of fingers oriented radially inward from the collar, wherein the plurality of fingers continuously measure the outer dimensions of the tubing, and
 a computer system configured to:
  receive data continually from the plurality of sensors, and trigger an alert based on the data received from the sensors.

8. The method of claim 7,
wherein the computer system further comprises preconfigured thresholds for characterizing measurements as at least one of, nominal, minor defects, and major defects.

9. The method of claim 8 further comprising:
triggering an alert if a minor defect is detected by the tubing measuring device.

10. The method of claim 8 further comprising:
stopping feeding of the tubing by the tubing feed system if a major defect is detected by the tubing measuring device.

11. The method of claim 7,
wherein the tubing feed system further comprises a reel that holds the tubing as coiled tubing for feeding into the conduit.

12. A non-transient computer-readable medium containing program instructions for causing a computer to perform a method comprising:

feeding tubing into a conduit via a tubing feed system comprising:

an injector head that directs the tubing into the conduit; and monitoring the condition of the tubing with a tubing measuring device comprising:

a collar configured to be fitted around the tubing; and a plurality of sensors comprising:

a plurality of ultrasonic transducers, wherein the plurality of ultrasonic transducers continuously measure a thickness of the tubing, wherein the plurality of ultrasonic transducers continuously monitor for defects, and a plurality of fingers oriented radially inward from the collar, wherein the plurality of fingers continuously measure outer dimensions of the tubing, wherein the computer is configured to:

receive data continually from the plurality of sensors, and trigger an alert based on the data received from the sensors, wherein the tubing measuring device is disposed between the injector head and the conduit.

13. The non-transient computer-readable medium of claim 12, further comprising threshold data for measurements to be characterized as at least one of nominal, minor defects, and major defects.

14. The non-transient computer-readable medium of claim 13, further comprising instructions for causing the computer to trigger an alert if a minor defect is detected in the tubing.

15. The non-transient computer-readable medium of claim 13, further comprising instructions for causing the computer to stop feeding of the tubing if a major defect is detected in the tubing.

16. The non-transient computer-readable medium of claim 12, further comprising instructions for causing the computer to uncoil the tubing from a reel for feeding into the conduit.

* * * * *